United States Patent
Munk-Hansen (10) Patent No.: US 8,690,537 B2
(45) Date of Patent: *Apr. 8, 2014

(54) ARRANGEMENT WITH A NACELLE AND A RADIATOR

(75) Inventor: Thorkil Munk-Hansen, Give (DK)

(73) Assignee: Siemens Aktiengesellschaft, Munich (DE)

( * ) Notice: Subject to any disclaimer, the term of this patent is extended or adjusted under 35 U.S.C. 154(b) by 760 days.

This patent is subject to a terminal disclaimer.

(21) Appl. No.: 12/942,071

(22) Filed: Nov. 9, 2010

(65) Prior Publication Data

US 2011/0123335 A1    May 26, 2011

(30) Foreign Application Priority Data

Nov. 24, 2009  (EP) .................................... 09014632

(51) Int. Cl.
*F03D 11/00*  (2006.01)

(52) U.S. Cl.
USPC .......................................................... 416/95

(58) Field of Classification Search
USPC ........................................................ 415/142
See application file for complete search history.

(56) References Cited

U.S. PATENT DOCUMENTS

| 3,260,305 A | 7/1966 | Leonard et al. |
| 5,732,765 A * | 3/1998 | Drolen et al. ................... 165/41 |
| 2010/0034653 A1 * | 2/2010 | Frokjaer ......................... 416/39 |

FOREIGN PATENT DOCUMENTS

| EP | 1835128 A2 | 9/2007 |
| JP | 2004285984 A | 10/2004 |
| NZ | 587736 A | 9/2011 |
| WO | WO 2006010783 A1 | 2/2006 |
| WO | WO 2010085960 A2 | 8/2010 |

OTHER PUBLICATIONS

Communication from A J Park, Jun. 21, 2011, pp. 1-4.
Communication From European Patent Office, Jan. 31, 2012, pp. 1-6.

* cited by examiner

*Primary Examiner* — Nathaniel Wiehe
*Assistant Examiner* — Jeffrey A Brownson (57) ABSTRACT

An arrangement with a nacelle and a radiator of a wind turbine is provided. The nacelle is rotatable connected with the radiator. Thus, a joint component of the wind turbine is built by these elements. The connection is constructed and arranged such that the radiator is allowed to pivot between a first position and a second position. The radiator is locked in the first position and projects above the nacelle when the radiator is used to remove heat from the nacelle to the environment. When the radiator is locked in the second position the radiator is close to a side of the nacelle. Thus a minimum height of the joint component is achieved.

12 Claims, 7 Drawing Sheets

N3, POS32, RAD3, service position, transport position.

FIG 3D

N3, RAD3, H31

ARRANGEMENT WITH A NACELLE AND A RADIATOR

CROSS REFERENCE TO RELATED APPLICATIONS

This application claims priority of European Patent Office Application No. 09014632.5 EP filed Nov. 24, 2009, which is incorporated by reference herein in its entirety.

FIELD OF INVENTION

The invention relates to an arrangement with a nacelle of a wind turbine and with a radiator, which is arranged on top of the nacelle.

BACKGROUND OF INVENTION

The radiator is connected with the outer surface of the nacelle and is used to radiate heat, which is generated inside the nacelle to the ambient air.

The transport of wind turbine components is a challenge due to the physical dimensions of the components. Especially nacelles for an offshore site may show a length up to 12 meters or more and a diameter up to 5 meters.

For a transportation on roads it is necessary, to plan the road-connection carefully, as a transport-vehicle has to circumvent or has to cope with all barriers like curves, tunnels, bridges, traffic lights, etc.

One example is the Elbe-tunnel, which is close to Hamburg, Germany. The tunnel shows a minimum height of 4.20 m, thus a transported component and the used vehicle has to comply with this height.

In Europe a standard height of new bridges is 4.50 m, but there are many older bridges, which show a lower height of clearance.

Thus the transport vehicle and the transported component have to be constructed in a way that they comply with all of those traffic barriers or traffic restrictions along the way to a planned site for the wind turbine.

Thus the construction of wind turbine components with a high diameter is limited in a certain way.

It is well-known that a radiator is arranged on top of a wind turbine. Due to the transport limitations the radiator and the nacelle are transported separately to the planned site. At the site the radiator is placed on top of the nacelle and is connected with the nacelle.

SUMMARY OF INVENTION

It is an object of the present invention to provide an improved arrangement with the nacelle and the radiator, which allows reduction of the complexity of the transport.

This object is achieved by an arrangement as claimed in the independent claim. Preferred configurations are object of the dependent claims.

The arrangement contains a nacelle and a radiator. The nacelle is connected with a rotational axis. The radiator is connected with the rotational axis, too. Thus the radiator can be turned around the rotational axis between a first position and a second position.

If the radiator is turned in the first position the radiator projects above the nacelle. Thus the radiator can be used in this position to transmit heat, which is generated inside the nacelle, to the environment.

If the radiator is turned in the second position the radiator does not project above the nacelle or does only project by a minimum height above the nacelle. Thus the nacelle and the radiator show as common component a certain predefined minimum height.

This allows the transport of the nacelle and the radiator as single component. The second position of the radiator allows a minimum height of the nacelle and of the radiator. Thus barriers like tunnels or bridges along the way of transport can be overcome.

Preferably the rotational axis is close to the top side of the nacelle and near to its rear side. Thus the first position of the radiator is on top of the nacelle, while the second position is close to the rear side, while the rear side is not topped by the radiator.

Thus the second position of the radiator is kept while the nacelle is transported to the side of the wind turbine, while the first position is the working-position of the radiator at the site of the wind turbine.

The radiator can be installed and connected in a controlled production facility. It is no longer necessary to transport the nacelle and the needed radiator as separate components to the site.

Preferably the radiator and the nacelle are connected by flexible tubes, which are used to transport a cooling medium between the nacelle and the radiator. The connection between the radiator and the nacelle is closed at the production facility and maintained later.

Thus the cooling medium can be filled into the closed cooling system at the production facility and therefore in a controlled environment.

According to the claimed invention there is no longer the need to use a crane for the installation of the radiator to the nacelle at the site. Thus personal do not longer have to climb on top of the nacelle to install and fixate the radiator in the first position. Further, there is no longer the need for a separated shipment of the radiator and the nacelle to the site.

BRIEF DESCRIPTION OF THE DRAWINGS

The invention is described now in more detail by help of figures. The figures show different examples and do not limit the scope of the invention.

DETAILED DESCRIPTION OF INVENTION

Figure 1:
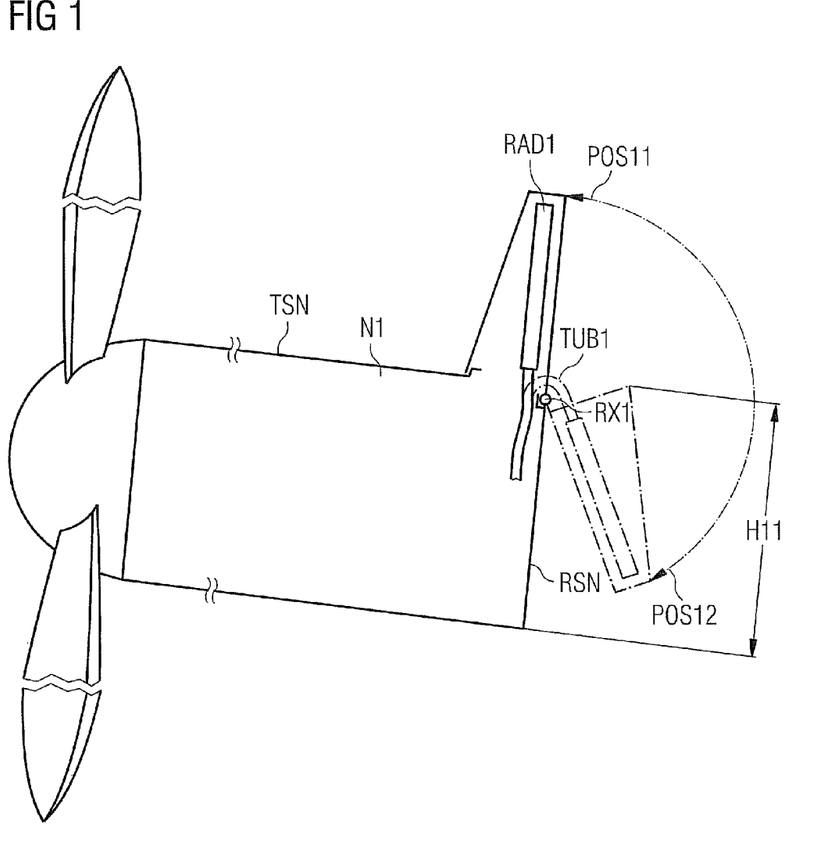
FIG. 1 shows the arrangement according to the invention.

FIG. 1 shows the arrangement according to the invention. A nacelle N1 is connected with a rotational axis RX1. A radiator RAD1 is connected with the rotational axis RX1, too. Thus the radiator RAD1 can be turned around the rotational axis RX1 between a first position POS11 and a second position POS12.

If the radiator RAD1 is turned in the first position POS11 the radiator RAD1 projects above the nacelle N1. Thus the radiator RAD1 can be used in this position POS11 to transmit heat, which is generated inside the nacelle N1, to the environment.

If the radiator RAD1 is turned in the second position POS12 the radiator RAD1 does not project above the nacelle N1 or does only project by a certain height above the nacelle N1.

Thus the nacelle N1 and the radiator RAD1 show a common certain minimum height H11.

Preferably the rotational axis RX1 is close to the top side TSN of the nacelle N and near to the rear side RSN of the nacelle N1.

Preferably the radiator RAD1 and the nacelle N1 are connected by flexible tubes TUB1, which are used to transport a cooling medium between the nacelle N1 and the radiator RAD1. This flexible connection TUB1 between the radiator RAD1 and the nacelle N1 is already joined at the production facility and thus is kept for the transportation.

FIG. 2A to FIG. 2D show different perspectives of the arrangement in reference to FIG. 1. In reference to FIG. 1 these figures show the radiator schematically without housing.

Figure 2A:
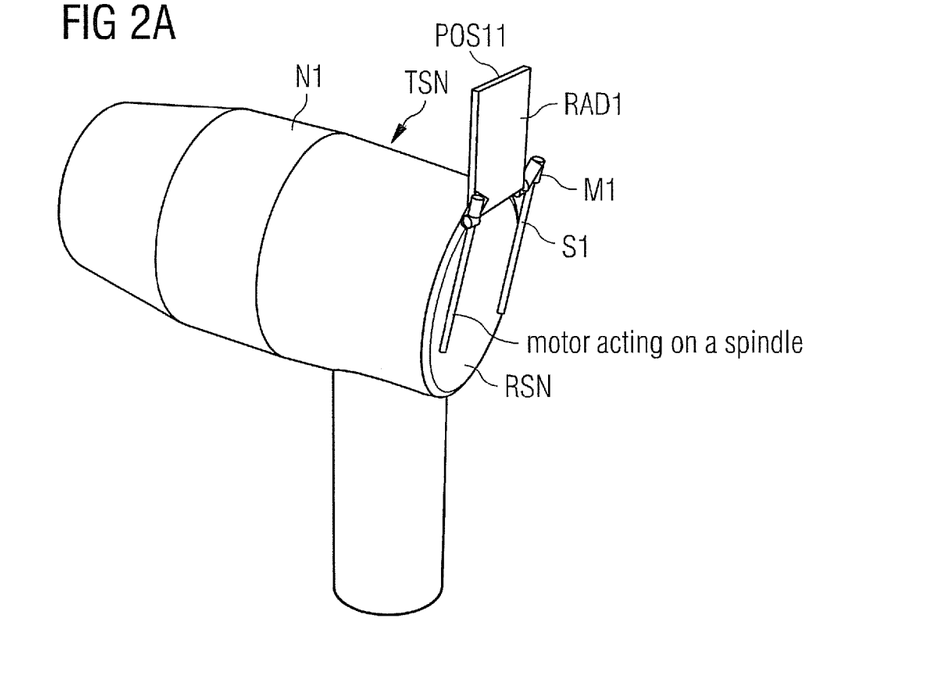
FIG. 2 shows different perspectives of the arrangement according to the invention.
Figure 2B:
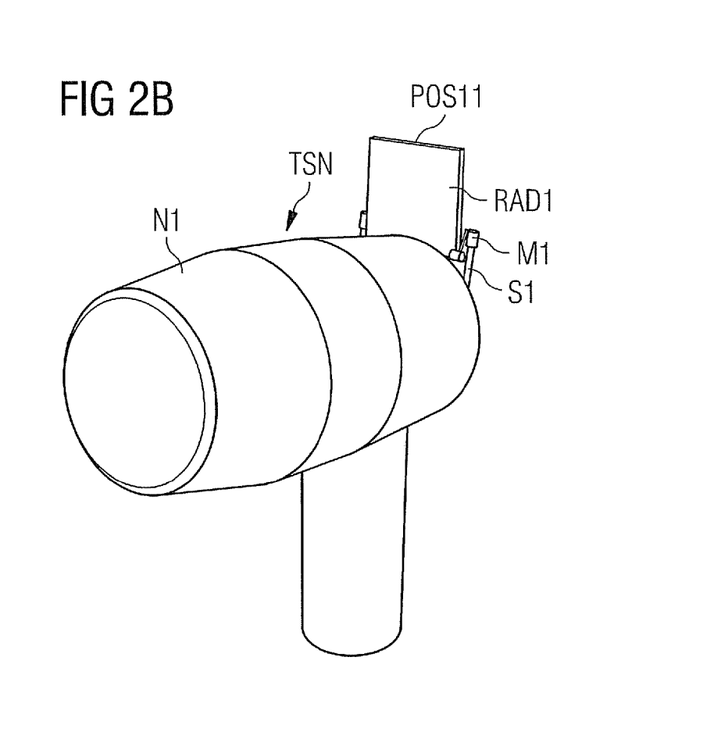

FIG. 2A and FIG. 2B show the radiator RAD1 and the nacelle N1, while the radiator RAD1 is brought to the first position POS11. This is the "work-position" of the radiator RAD1.

To move the radiator RAD1 in its upright position POS11 an electrical motor M1 is used, which is acting on a spindle S1. It is also possible to use other arrangements for this movement—for example pneumatic-systems or hydraulic-systems.

Figure 2C:
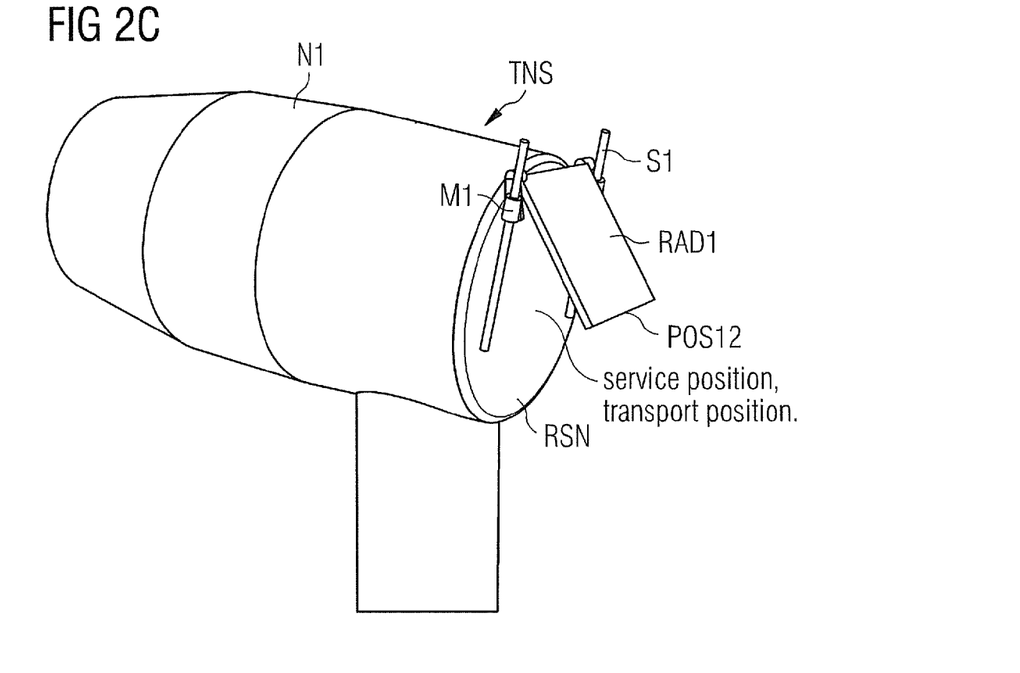
Figure 2D:
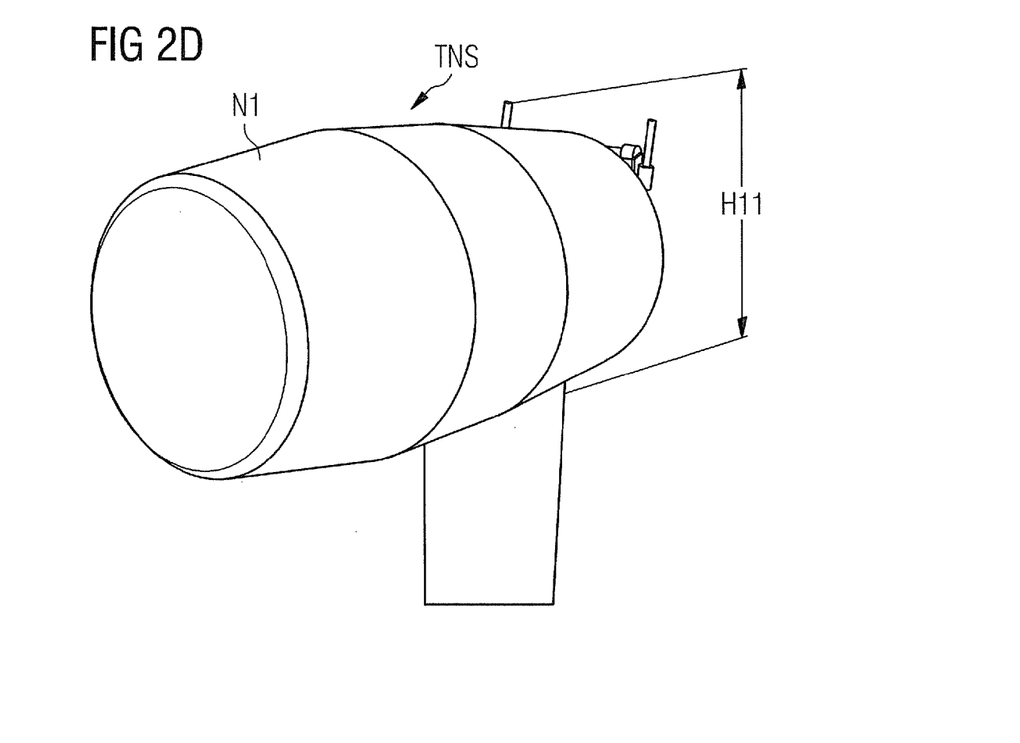

FIG. 2C and FIG. 2D show the radiator RAD1 and the nacelle N1, while the radiator RAD1 is brought to the second position POS12. This is the transport-position of the radiator RAD1, while the radiator RAD1 is connected with the nacelle N1 to form a single component.

The position POS12 can also be used for service tasks. Preferably the rear side RSN of the nacelle N1 contains an opening for this purpose. This allows service-actions by personal without leaving the nacelle N1.

To move the radiator RAD1 in this position POS12 the electrical motor M1 is used, which is acting on the spindle S1 as described above.

Thus the nacelle N1 and the radiator RAD1 show the common certain minimum height H11 during the transport.

FIG. 3A to FIG. 3D show different perspectives of a preferred configuration of the arrangement according to the invention.

This configuration shows a radiator RAD3, which is formed like a channel. Thus the heat of the nacelle N3 is transferred easily to the environment by the use of huge areas of the radiator R3.

Figure 3A:
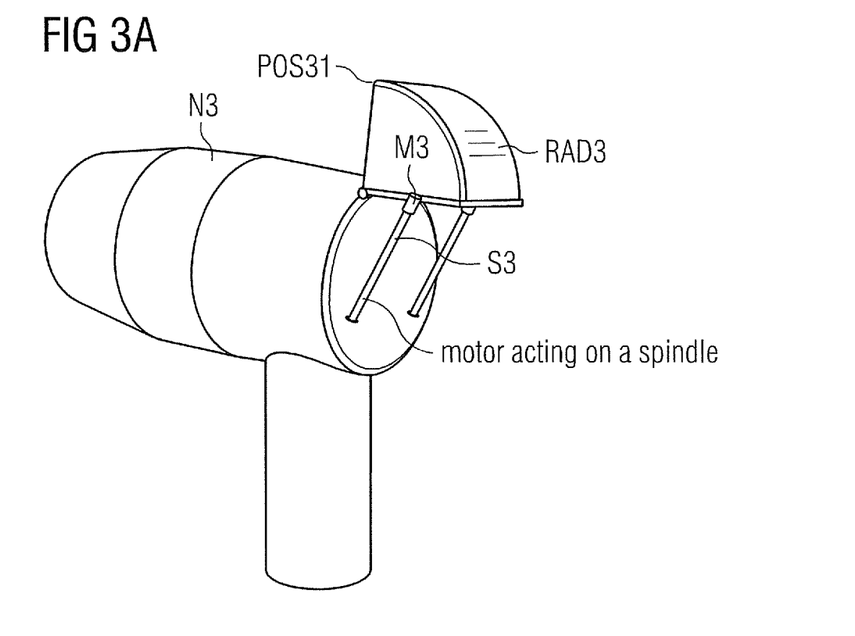
FIG. 3 shows different perspectives of a preferred configuration of the arrangement according to the invention.
Figure 3B:
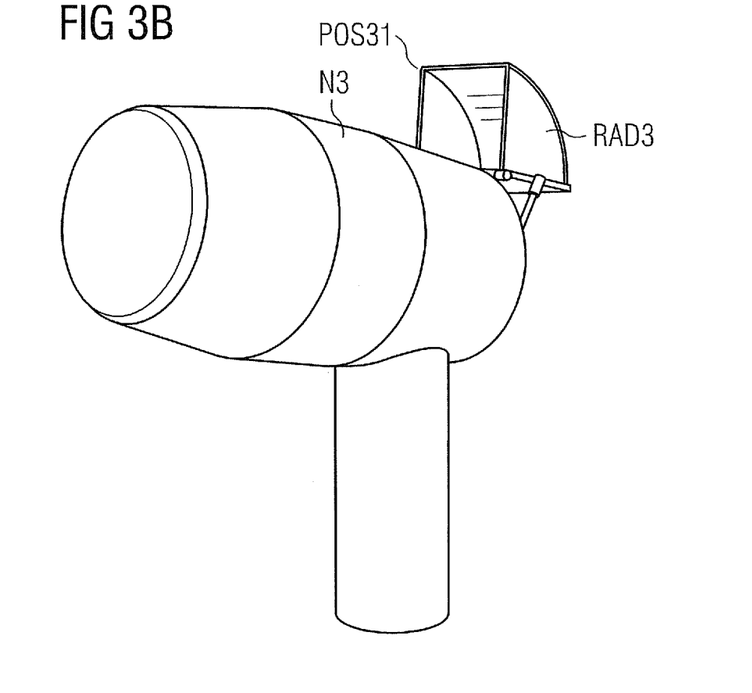

FIG. 3A and FIG. 3B show the radiator RAD3 and the nacelle N3, while the radiator RAD3 is brought to the first position POS31. This is the "work-position" of the radiator RAD3.

To move the radiator RAD3 in its upright position POS31 an electrical motor M3 is used, which is acting on a spindle S3. It is also possible to use other arrangements for this movement—for example pneumatic-systems or hydraulic-systems.

Figure 3C:
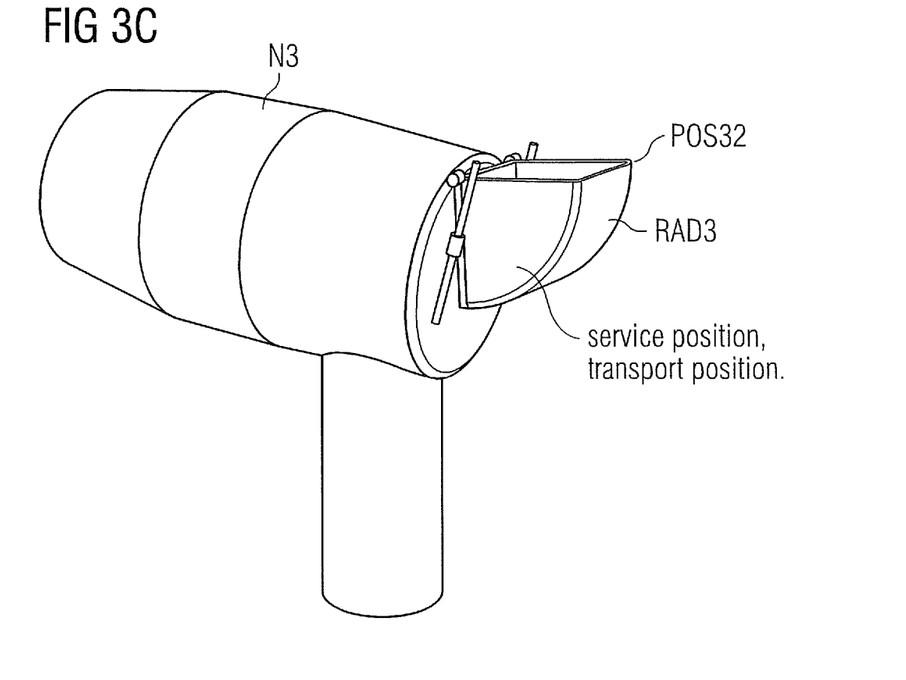
Figure 3D:
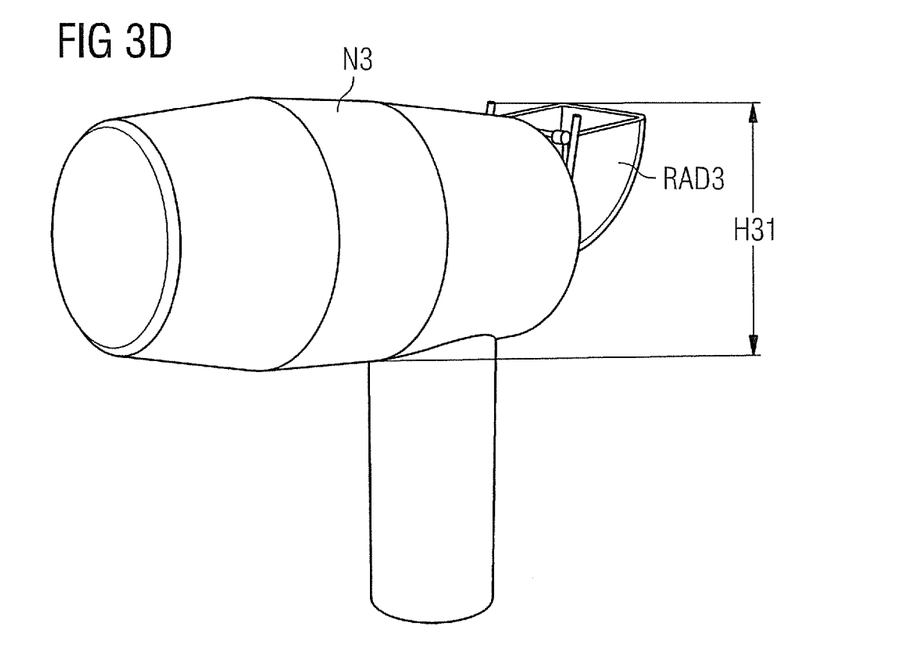

FIG. 3C and FIG. 3D show the radiator RAD3 and the nacelle N3, while the radiator RAD3 is brought to the second position POS32. This is the transport-position of the radiator RAD3, while the radiator RAD3 is connected with the nacelle N3 to form a single component.

To move the radiator RAD3 in this position POS32 the electrical motor M3 is used, which is acting on the spindle S3 as described above.

Thus the nacelle N3 and the radiator RAD3 show the common certain minimum height H31 during the transport.

Figure 4:
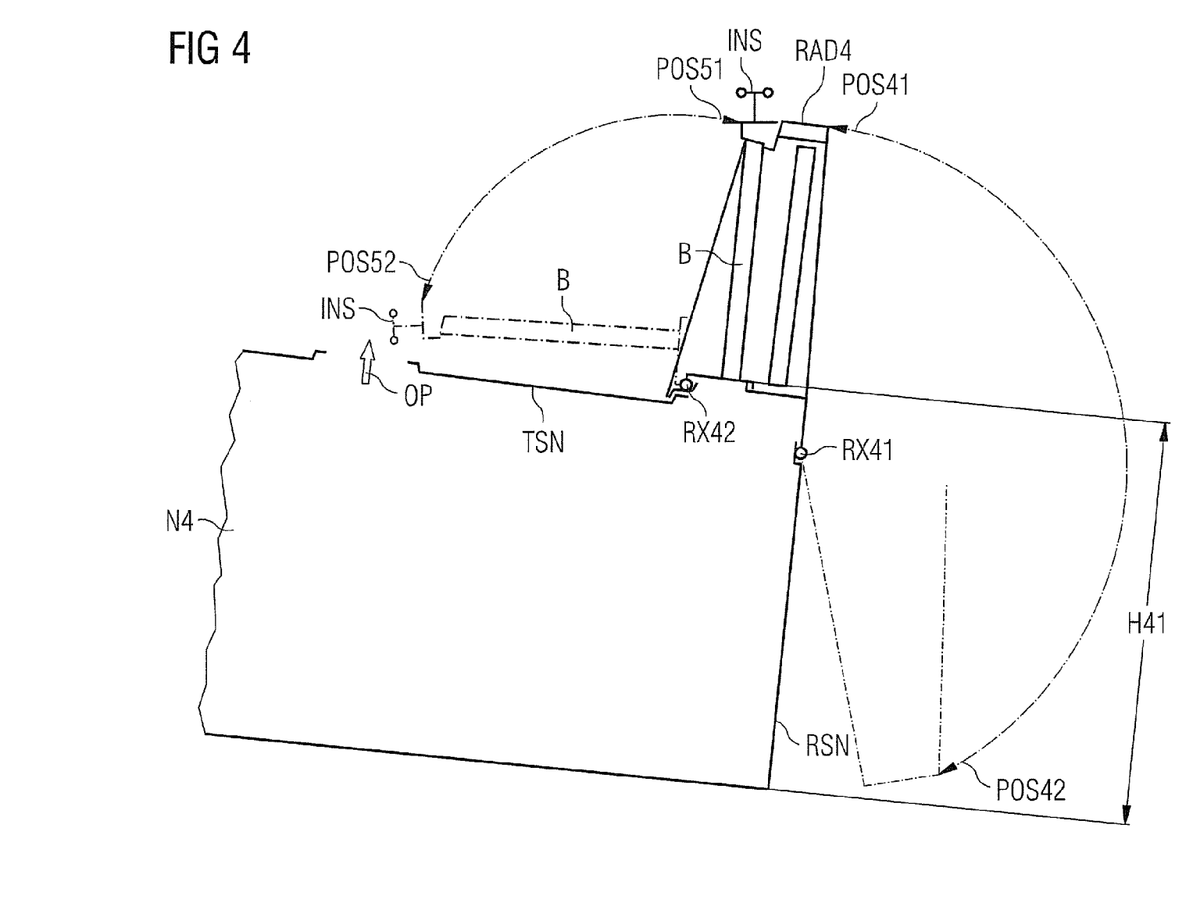
FIG. 4 shows a preferred configuration of the arrangement according to the invention.

FIG. 4 shows a preferred configuration of the arrangement according to the invention.

A nacelle N4 is connected with a first rotational axis RX41. A radiator RAD4 is connected with the first rotational axis RX41, too. Thus the radiator RAD4 can be turned around the first rotational axis RX41 between a first position POS41 and a second position POS42.

If the radiator RAD4 is turned in the first position POS41 the radiator RAD4 projects above the nacelle N4. Thus the radiator RAD4 can be used in this position POS41 to transmit heat, which is generated inside the nacelle N4, to the environment.

If the radiator RAD4 is turned in the second position POS42 the radiator RAD4 does not project above the nacelle N4 or does only project by a certain height above the nacelle N4.

Thus the nacelle N4 and the radiator RAD4 show a common certain minimum height H41.

Preferably the first rotational axis RX41 is close to the top side TSN of the nacelle N and near to its rear side RSN.

A bar B is used to carry instruments INS, which are used to measure the wind speed or other environmental parameters, for example.

The bar B is connected to a second rotational axis RX42. The second rotational axis RX42 is an integrated part of the radiator RAD4.

The bar B can be turned around the second rotational axis RX42 between a first position POS51 and a second position POS52.

If the bar B is turned to the first position POS51 the bar B projects together with the radiator RAD4 above the nacelle N4. Thus the bar B can be used in this position POS51 to measure the environmental parameters.

If the bar B is turned to the second position POS52 the bar B is close to the top side TSN of the nacelle N. Thus the instruments INS can be adjusted from inside the nacelle N4 via an opening OP in the nacelle N. Thus there is no need for personal to leave the nacelle N4 for the maintenance or service of the instruments INS.

As the second rotational axis RX42 is an integrated part of the radiator RAD4, the radiator RAD4 and the bar B can be turned around the first rotational axis RX41 as single component and into the transport position POS42.

Figure 5:
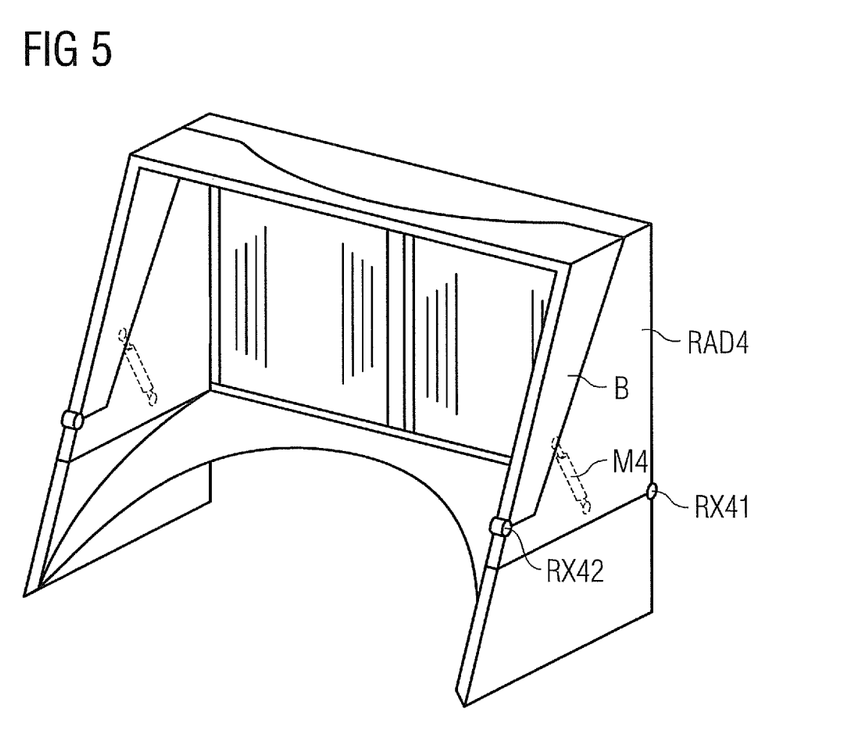
FIG. 5 shows details of the preferred configuration in reference to FIG. 3 and FIG. 4.

FIG. 5 shows details of the preferred configuration in reference to FIG. 4. To turn the bar B a motor M4 is used. The motor M4 may be an integrated part of the radiator RAD4.

The invention claimed is:

1. Arrangement with a nacelle and a radiator of a wind turbine,
   wherein the nacelle is rotatably connected with the radiator in order to build with the radiator a joint component of the wind turbine,
   wherein the connection is constructed and arranged such that the radiator is allowed to pivot between a first position and a second position,
   wherein when the radiator is locked in the first position, the radiator projects above the nacelle to remove heat from the nacelle to an environment, and,
   wherein when the radiator is locked in the second position, the radiator is close to a side of the nacelle to achieve a minimum height of the joint component,
   wherein the radiator is connected to a second rotational axis,
   wherein a bar is connected to the second rotational axis in order to build a joint component, and
   wherein the bar is constructed such that instruments are supported, the instruments being used to measure environmental parameters.

2. The arrangement according to claim 1, wherein the nacelle is connected with a rotational axis and where the radiator is connected with the rotational axis.

3. The arrangement according to claim 2, wherein the rotational axis is arranged close to a top side of the nacelle.

4. The arrangement according to claim 2, wherein the rotational axis is arranged near to a rear side of the nacelle.

5. The arrangement according to claim 2, wherein the rotational axis is arranged close to a top side of the nacelle and near to a rear side of the nacelle.

6. The arrangement according to claim 1, wherein the radiator and the nacelle are connected by flexible tubes, which are used to transport a cooling medium between the nacelle and the radiator for the transfer of heat.

7. The arrangement according to claim 1, wherein an electrical or a pneumatic or a hydraulic motor-system is connected to the radiator in order to change a position.

8. The arrangement according to claim 1, wherein an electrical or a pneumatic or a hydraulic motor-system is connected to the nacelle in order to change a position.

9. The arrangement according to claim 1, wherein an electrical or a pneumatic or a hydraulic motor-system is connected to the radiator and the nacelle in order to change a position.

10. The arrangement according to claim 1,
wherein the bar is connected to the second rotational axis such that the bar is allowed to pivot between a first position and a second position,
wherein the bar projects together with the radiator above the nacelle in the first position, while the instruments are used to measure the environmental parameters, and
wherein the bar is close to a top side of the nacelle in the second position, while the instruments of the bar are adjusted and maintained from inside the nacelle via nacelle openings.

11. The arrangement according to claim 1, wherein the second rotational axis is an integrated part of the radiator.

12. The arrangement according to claim 10, wherein the second rotational axis is an integrated part of the radiator.

\* \* \* \* \*